United States Patent [19]

Thayer

[11] 4,192,592
[45] Mar. 11, 1980

[54] CHEMICALLY DEHYDRATED COLD CAMERA

[76] Inventor: Robert H. Thayer, 1501 Ariz. St., El Paso, Tex. 79902

[21] Appl. No.: 917,024

[22] Filed: Jun. 16, 1978

[51] Int. Cl.$^2$ ............................................. G03B 29/00
[52] U.S. Cl. ...................................... 354/76; 354/354
[58] Field of Search ................... 354/75, 76, 79, 203, 354/354, 150; 350/19, 66

[56] References Cited

U.S. PATENT DOCUMENTS

| | | | |
|---|---|---|---|
| 2,753,760 | 7/1956 | Braymer | 354/79 X |
| 3,667,358 | 6/1972 | Williams | 354/354 |
| 4,038,669 | 7/1977 | Guerra | 354/76 |

Primary Examiner—John Gonzales
Attorney, Agent, or Firm—Clarence A. O'Brien; Harvey B. Jacobson

[57] ABSTRACT

The air-tight film chamber of a cold camera is maintained moisture free by the action of a chemical dehydrator held in packet form within an auxiliary enclosure attached to the front housing section of the camera within which the film is movably mounted for multiple exposures. A rear housing section detachably assembled to the front section carries the refrigerating means for maintaining the film at a low temperature, inhibiting latent image decay.

9 Claims, 9 Drawing Figures

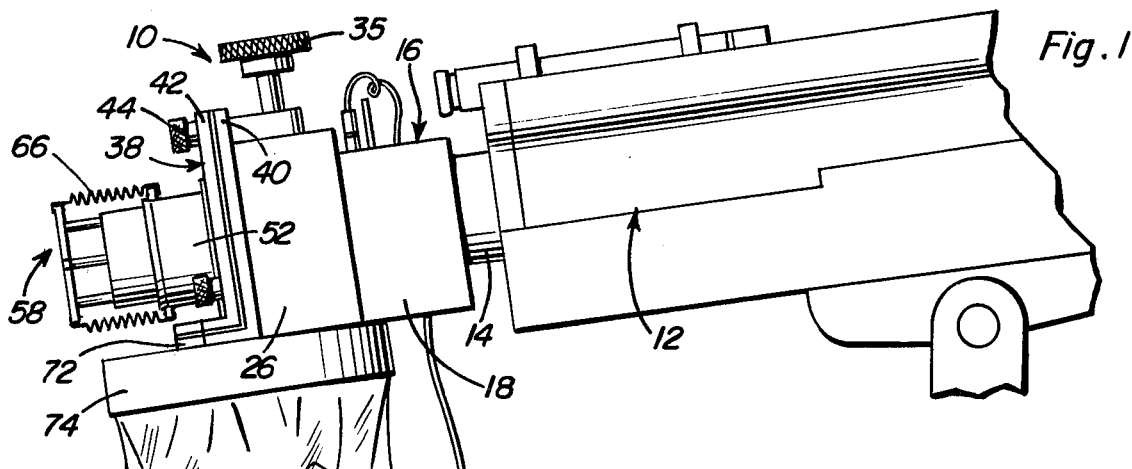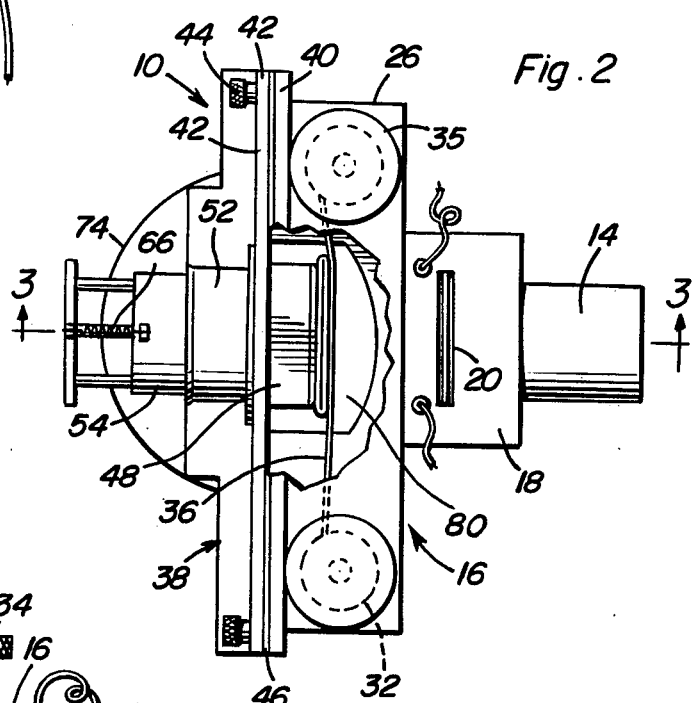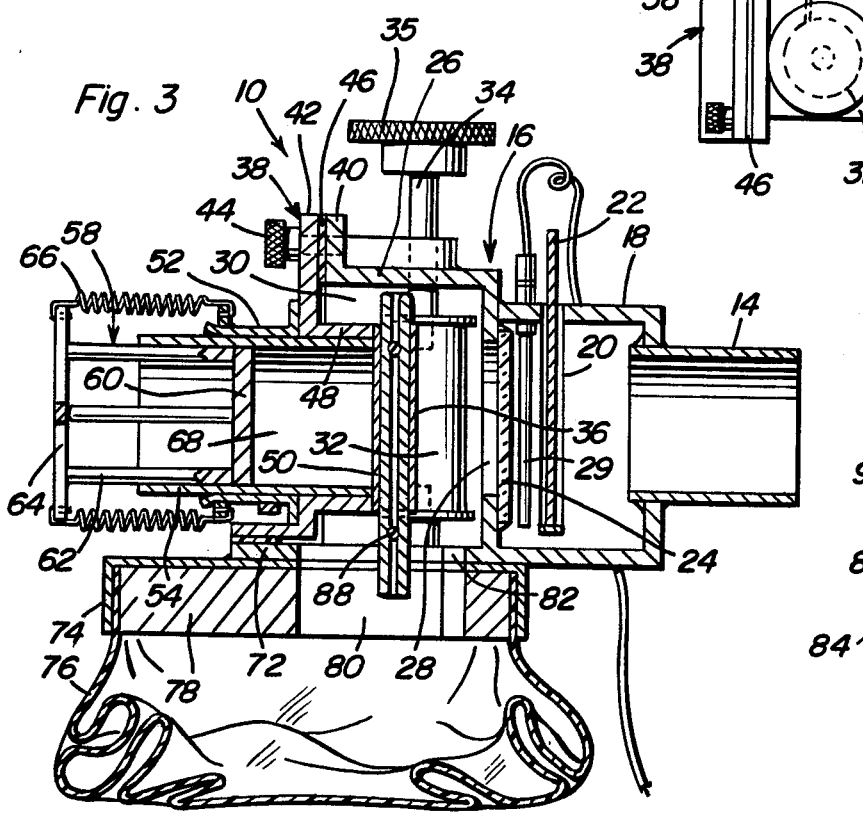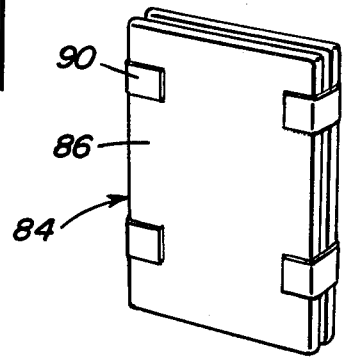

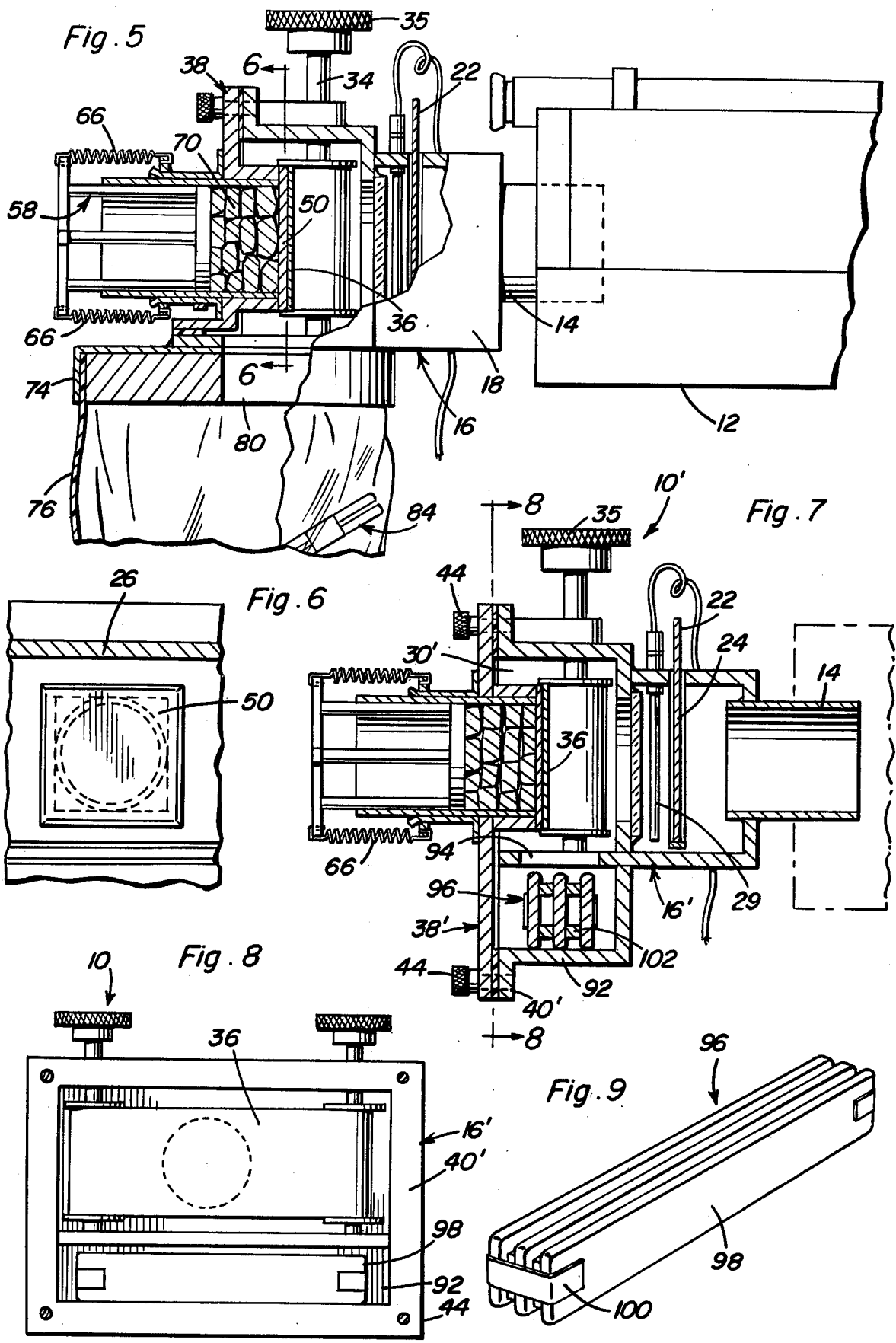

CHEMICALLY DEHYDRATED COLD CAMERA

BACKGROUND OF THE INVENTION

This invention relates to astrophotography in general and more particularly to the use of what is referred to as "cold cameras" as attachments to astronomical telescopes.

There has been a relatively recent revival in the use of cold cameras wherein the film is maintained at a low temperature to inhibit latent image decay, thereby avoiding the necessity of using prolonged exposure times. The major problem with use of cold cameras is the precipitation of ice particles on the film resulting from the freezing of moisture in the ambient air to which the film is exposed. At the present time, there are three basic known types of cold cameras, which deal with the moisture problem. These known cameras are referred to as (1) vacuum cold cameras, (2) dry air cold cameras and (3) plug cold cameras. In the vacuum cold camera, a pump evacuates the air and moisture entrained therein from the film chamber. Aside from its expense, use of a vacuum pump is bothersome and sometimes unreliable. In the dry air cold camera, dry air or nitrogen is used to flush the film chamber. This method is fully effective only in dry climates. In the plug cold camera, a plastic plug is used to displace air adjacent the film. However, the use of the plug inhibits rapid and effective freezing of the film and reduces the light-gathering power. Because of the constructional arrangements associated with cold cameras of the foregoing types, film must be loaded in the dark. Further, the moisture removal procedure must be frequently repeated.

It is therefore an important object of the present invention to provide a cold camera within which a moisture free atmosphere is maintained without the aforementioned drawbacks associated with existing cold cameras. In accordance with the foregoing objects, it is a particular object of the present invention to enable loading of a cold camera in daylight and to provide a cold camera in which multiple exposures may be obtained without unloading and reconditioning the interior of the camera.

SUMMARY OF THE INVENTION

In accordance with the present invention, a cold camera has a body formed from two detachable housing sections which form an air-tight film chamber when assembled. The front housing section carries a cassette roller type film assembly enabling multiple film exposure through a front window externally heated by an electrical heating element to prevent condensation of moisture thereon. An auxilary enclosure is attached to the front housing section and carries a chemical dehydrating unit by means of which the film chamber is maintained in a moisture free condition while the housing sections are assembled. The assembly of the housing sections permits both loading or unloading of the film and loading or unloading of the chemical dehydrating unit. The rear housing section carries the refrigerating means in the form of a chamber storing a relatively large quantity of dry ice held compacted against the film chamber.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a cold camera constructed in accordance with the present invention and shown installed on a telescope.

FIG. 2 is a top plane view of the cold camera shown in FIG. 1 but disassembled from the telescope, with parts broken away.

FIG. 3 is an enlarged side sectional view taken substantially through a plane indicated by section line 3—3 FIG. 2.

FIG. 4 is a perspective view of a chemical dehydrating packet utilized in the cold camera, as shown in FIGS. 1-3.

FIG. 5 is an enlarged partial side elevational view of the camera shown in FIG. 1 while in use, with parts broken away and shown in section.

FIG. 6 is a partial sectional view taken substantially through a plane indicated by section line 6—6 in FIG. 5.

FIG. 7 is a side sectional view similar to that of FIG. 3 but showing a modified form of cold camera in use.

FIG. 8 is a rear sectional view taken substantially through a plan indicated by section line 8—8 in FIG. 7.

FIG. 9 is a perspective view showing a chemical dehydrating packet utilized in the camera depicted in FIGS. 7 and 8.

DETAILED DESCRIPTION OF THE PREFERRED EMBODIMENTS

Referring now to the drawings in detail, FIGS. 1, 2 and 3 illustrate one embodiment of a cold camera constructed in accordance with the present invention and generally denoted by reference numeral 10. As shown in FIG. 1, the camera is installed on a typical telescope 12 by means of a tubular insert 14 attached to and projecting forwardly from the body of the camera. The tubular insert 14 is received within the draw tube of the telescope and thereby supports the camera 10 on the telescope as shown.

As more clearly seen in FIGS. 2 and 3, the body of the camera includes a front housing section 16 having a rectangular portion 18 to which the camera-supported insert 14 is attached. A slot 20 is formed on the top of the housing portion 18 for receiving a shutter element 22 adapted to be positioned in front of a glass window 24 cemented to a film chamber housing portion 26 of the front housing section covering an aperture opening 28, as more clearly seen in FIG. 3. An electrical heating element 29 is positioned between the window 24 and shutter slot 20. The heater element is energized by connection to a suitable external battery source in order to evaporate and prevent deposit of moisture on the window 24. The shutter element 22 may be removed and inserted by hand in order to control exposure of film within a film chamber 30 enclosed by the housing portion 26 of the front housing section 16.

The film chamber housing portion 26, as more clearly seen in FIG. 2, extends laterally beyond the housing portion 18 for mounting a pair of film roller devices 32 such as the metal film cassettes housing commercially available rolls of 60 mm Tri X film of 30" length. These film cassettes are rotatably mounted within the housing by means of spool shafts 34. The upper spool shafts extend above the housing portion 26 and have control knobs 35 attached thereto. The film 36 which extends between the film roller cassettes 32, as more clearly seen in FIG. 2, may accordingly be exposed through the aperture opening 28 upon withdrawal of the shutter element 22. By manipulating the knobs 35, separate frame portions of the film may be sequentially exposed for the desired prolonged period of time required in connection with astronomical photography.

The front housing section 16 of the camera is detachably assembled to a rear housing section generally referred to by reference numeral 38. Confronting flanges 40 and 42 are therefore formed on the front and rear housing sections between which removable clamp devices 44 extend to hold the housing sections assembled. A sealant 46, such as vasoline, is placed between the flanges prior to assembly in order to establish airtight conditions within the film chamber 30.

The rear housing section 38 includes a forwardly projecting portion 48 closed at its forward end by an aluminum film plate 50, as shown in FIG. 3. A tubular support 52 is attached to the rear housing section and extends rearwardly therefrom for supporting a tubular casing 54 having one axial end abutting the film plate 50 within the rear housing section. A plunger assembly 58 is reciprocally mounted within the tubular casing 54 and is provided at one axial end with a ram disc 60 to which a plurality of rearwardly extending rods 62 are attached. Actuator elements 64 are attached to the rods 62 exteriorly of the tubular casing 54 to which the ends of spring elements 66 are attached. The spring elements may be anchored to the tubular casing 54 in order to exert a continuous axial bias on the plunger ram disc 60 enclosing a contractable chamber 68 within the tubular casing 54 for dry ice. Dry ice 70, as shown in FIG. 5, together with tubular casing 54 and plunger assembly 58 form a refrigerating means for maintaining the film 36 at a freezing temperature such as −190 degrees F., which inhibits latent image decay. The film plate 50 in contact with the dry ice 70 establishes a heat-conductive path between the film and the refrigerating means for this purpose.

With continued reference to FIGS. 1-3, the front housing section 16 includes a lower extension 72 to which the rear housing section is adapted to be sealed in overlying relation thereto. A downwardly depending, circular retainer 74 is attached, as by welding, to the lower extension 72 of the front housing section for supporting an auxiliary enclosure in the form of a flexible plastic bag 76. The upper rim portion of the bag is clamped to the retainer 74 by a circular block 78 having an access opening 80 formed therein in alignment with an opening 82 formed in the lower extension 72 of the front housing section. The access openings 80 and 82 establish communication between the film chamber 30 and the interior of the plastic bag 76.

The housing sections hereinbefore described are made of a relatively rigid and opague material such as plastic, wood or metal and/or combinations thereof. The flexible enclosure bag 76, on the other hand, is made of an air impermeable material such as "Saran" so as to maintain airtight conditions within the film chamber 30 when the front and rear housing sections are assembled to each other by means of the clamps 44. When the housing sections are detached from each other and disassembled, access will be provided to the interior of the film chamber 30 and to the interior of the bag 76 through the access openings 82 and 80.

The bag enclosure 76 is designed to carry a chemical dehydrating unit in the form of a packet 84, as shown in FIGS. 1 and 4. The chemical dehydrating packet will accordingly maintain the film chamber 30 in a moisture-free condition while the housing sections are sealingly assembled to each other in an airtight manner. The packet 84 may be formed by confronting rectangular frame members 86, made of a suitable material such as wood. The frame members 86 are closely spaced from each other by spacers 88, as more clearly seen in FIG. 3. A chemical dehydrator composition may be impregnated into layers of paper retained between the frame members 86 held assembled to each other by tapes 90, as shown in FIG. 4. Chemical dehydrators are per se well known as indicated, for example, in U.S. Pat. No. 1,867,256 to Egli.

The cold camera 10, shown in FIGS. 1-3, is suitable for use in very humid climates. The chemical dehydrating packet 84 is inserted into the camera prior to assembly of the front and rear housing sections so as to be held near the film 36 as shown in FIG. 3. The housing sections are then assembled, as shown, to form the airtight seal for chamber 30. After a certain period of time necessary to completely remove moisture from the film chamber 30, the chemical dehydrating packet is permitted to drop or be deposited into the enclosure bag 76. The refrigerating means may then be activated by loading the chamber 68 with dry ice 70, as shown in FIG. 5. The plunger assembly 58 may then be installed, as shown, in order to maintain a constant pressure on the dry ice against the film plate 50. The camera is then ready for use. One charge of dry ice in chamber 68 may be functional for an extended period of time during which multiple exposures may be made on the film 36. After the film has been fully exposed, the housing sections are detached for removal of the film, as well as replacement of the dry ice and chemical dehydrating packet, if necessary.

FIGS. 7 and 8 illustrate a modified form of cold camera 10', suitable for dry climates. The camera 10' differs from the camera 10 hereinbefore described in that front housing section 16' has a rigid type of auxiliary enclosure 92 attached to the lower portion thereof. The rear housing section 38' is adapted to be sealingly clamped by the clamp elements 44 to a clamping flange 40' associated with the front housing section 16' and auxiliary enclosure 92. Fluid communication between the interior of the auxiliary enclosure 92 and film chamber 30' is established by the openings 94. The film, as well as a chemical dehydrating packet 96, is loaded into the camera prior to assembly of the front and rear housing sections. The construction for camera 10' is otherwise the same as that of camera 10, including the carrying of the refrigerating means by the rear housing section. However, the chemical dehydrating packet 96 is directly inserted into the auxiliary enclosure 92 and is operative to maintain the requisite moisture-free conditions within the film chamber 30'. The chemical dehydrating packet 96 includes three elongated frame membvers held assembled by end tapes 100 in spaced-apart relationship. Spacers 102, as shown in FIG. 7 hold frame members 98 spaced apart for retaining therebetween layers of absorbent paper within which the chemical dehydrating composition is entrained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In a multiple exposure camera having a sealed housing enclosing an airtight film chamber through which photographic film is displaced from a storage roll and positioned for prolonged exposure through an exposure window and a contractible refrigerating chamber within which dry ice is stored for maintaining the film at a temperature inhibiting latent image decay, means for preventing precipitation of ice on the film, comprising an auxiliary enclosure attached to the housing having an access opening in communication with said film chamber, chemical dehydrating means carried in said enclosure for removing moisture from said film chamber, and means for externally heating said exposure window of the film chamber to prevent condensation of moisture thereon.

2. The combination of claim 1 wherein said housing includes detachable sections respectively enclosing the film chamber and the refrigerating chamber, the auxiliary enclosure being attached to one of said sections to expose said access opening when the other of the sections is detached.

3. The combination of claim 2 wherein said chemical dehydrating means comprises a packet insertable into the auxiliary enclosure through the access opening.

4. The combination of claim 3 including a film plate mounted within said film chamber establishing a heat conductive path between the film and said refrigerating chamber, said dehydrating packet being held near the film plate prior to deposit into the auxiliary enclosure.

5. The combination of claim 1 wherein said housing includes detachable sections respectively enclosing the film chamber and the refrigerating chamber, the auxiliary enclosure being attached to one of said sections enclosing the film chamber to expose said access opening when the other of the sections is detached.

6. The combination of claim 1 wherein said chemical dehydrating means comprises a packet insertable into the auxiliary enclosure through the access opening.

7. The combination of claim 1 including a film plate mounted within said film chamber establishing a heat conductive path between the film and said refrigerating chamber, said dehydrating packet being held near the film plate prior to deposit into the auxiliary enclosure.

8. In a cold camera having a sealed housing enclosing an airtight film chamber provided with an exposure window through which photographic film is exposed and elongated refrigerating means projecting from the housing for cooling the film to a temperature inhibiting latent image decay, the improvement residing in an auxiliary enclosure attached to the housing, chemical dehydrating means insertable into said enclosure for maintaining the film chamber moisture free, and heating means for preventing condensation of moisture externally on said exposure window during cooling of the film chamber by the refrigerating means.

9. In a cold camera as defined in claim 8, roller means for storing the film and displacing the same through the film chamber while being cooled by the refrigerating means.

* * * * *